(No Model.)

W. MEREDITH & A. M. HUNT.
MEANS FOR OPERATING GENERATORS AND STORAGE BATTERIES IN CONJUNCTION.

No. 589,186. Patented Aug. 31, 1897.

Witnesses
Perry Kingman.
Alfred T. Townsend.

Inventor
Wynn Meredith and
Andrew M. Hunt
by Hazard Townsend
their attys.

UNITED STATES PATENT OFFICE.

WYNN MEREDITH AND ANDREW M. HUNT, OF SAN FRANCISCO, CALIFORNIA.

MEANS FOR OPERATING GENERATORS AND STORAGE BATTERIES IN CONJUNCTION.

SPECIFICATION forming part of Letters Patent No. 589,186, dated August 31, 1897.

Application filed September 8, 1896. Serial No. 605,189. (No model.)

*To all whom it may concern:*

Be it known that we, WYNN MEREDITH and ANDREW M. HUNT, citizens of the United States, residing at San Francisco, in the county of San Francisco and State of California, have invented new and useful Means for Operating Generators and Storage Batteries in Conjunction, of which the following is a specification.

In carrying out this invention we make use of an electrical generator, which comprises a dynamo having two independent field-windings magnetically opposed, and also comprises a dynamo having two independent field-windings which are magnetically opposed, one of which is in series with the external circuit of an electrical generator and the other in shunt across the terminals of a source of approximately constant potential difference.

Our invention comprises the combination of an auxiliary dynamo, storage battery, and main dynamo, the armature of the auxiliary dynamo and the storage battery being connected in series and the two being in shunt with the main dynamo, the auxiliary dynamo having two independent field-windings magnetically opposed, one being in series with the external circuit of the main dynamo and the other in shunt with any source of approximately constant potential difference.

It also includes the combination of two or more generators with one or more storage batteries and an external circuit or circuits, so connected that the storage battery or batteries will automatically receive or deliver charge as the demand in the external circuit or circuits rises above or falls below a predetermined amount.

The invention is illustrated by the accompanying drawings.

Figure 1:
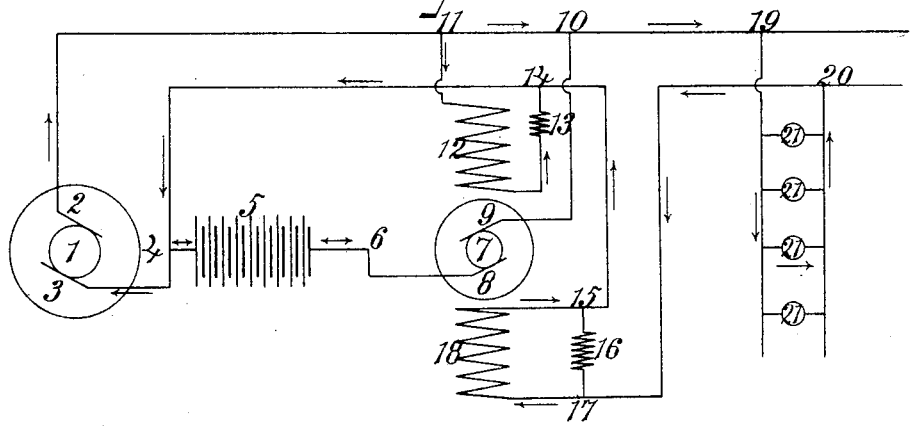
Figure 2:
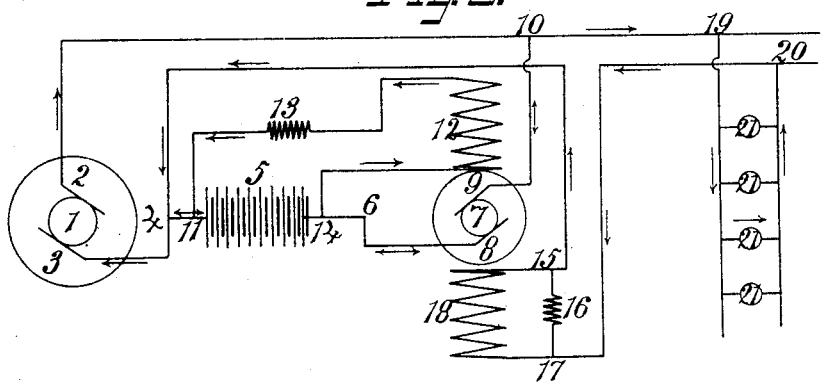
Figure 3:
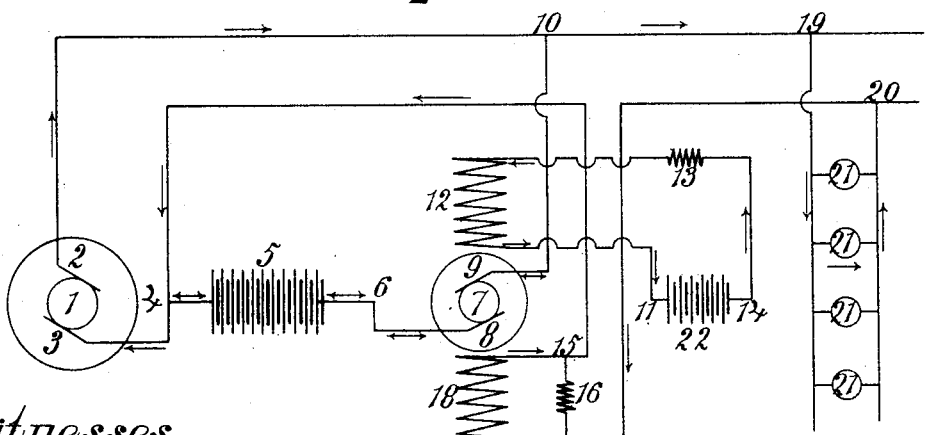

Figures 1, 2, and 3 are diagrammatic representations of several forms in which this invention may be applied.

Like characters indicate similar parts in the several views.

The description and action of this invention are as follows, reference being had to the drawings:

1 is a dynamo whose external circuit is 19 21 20.

7 is the armature of another dynamo having two independent field-windings 12 and 18, which are magnetically opposed.

5 is an electrical storage battery. The storage battery and armature 7 are in series, and the two are in shunt across the terminals of the dynamo 1.

The field-winding 18 is in series with the external circuit of dynamo 1, and 16 is a rheostat by means of which the amount of current flowing through 18 may be regulated at will.

The field-winding 12 may be in shunt with the dynamo 1, as shown in Fig. 1, or it may be in shunt with a storage battery 5, as shown in Fig. 2, or in shunt with any other source of approximately constant potential difference, as indicated at 22 in Fig. 3.

13 indicates a rheostat by means of which the resistance of this shunt may be varied at will.

The potential difference between the brushes 8 and 9 will vary inversely as the load in the external circuit 19 21 20. When the electromotive force of 7 is reduced below a certain point by increase of load in the external circuit 19 21 20, the battery 5 will deliver charge to the external circuit. As the load in the external circuit becomes light, the electromotive force of 7 rises and the battery receives charge. In this manner the load on 1 may be kept approximately constant, although the demand in the external circuit fluctuates. This combination is especially adapted for use in places where the fluctuations of external load are rapid and frequent, as in street-railway and most other power stations. It is to be understood that this same combination can be applied to steady the load in cases where two or more dynamos are coupled together.

The action of the combination is as follows: The rheostats 13 and 16 are so adjusted that with a certain amount of current flowing in the external circuit the sum of the electromotive forces of 1 and 7 is just sufficient to balance the discharging electromotive force of the storage battery, and it then neither receives nor delivers charge. Should the external load increase, the ampere-turns in 18 increase, and those in 12 remain approximately constant and the action of the two being opposed the electromotive force of 7 is lowered and the discharging electromotive force of the battery will be greater than the sum of the electromotive forces of 7 and 1, and the storage battery will deliver current to the line proportionate in amount to the increased demand. Should the load on the line fall below the amount at which the conditions of balance between the discharging electromotive force of the storage battery and the sums of the electromotive forces of 1 and 7 obtain, charge will be forced into the battery proportionate in amount to the decrease of load on the line due to the increased electromotive force of 7. In this way the load on 1 is kept approximately constant at the predetermined amount.

It is acknowledged that an auxiliary dynamo has been used to assist a generator in charging a storage battery by adding its electromotive force to that of the generator; but

What we claim as our invention, and desire to secure by Letters Patent, is—

The combination of an auxiliary dynamo, storage battery, and main dynamo, the armature of the auxiliary dynamo and the storage battery being connected in series, and the two being in shunt with the main dynamo; the auxiliary dynamo having two independent field-windings magnetically opposed, one being in series with the external circuit of the main dynamo, and the other in shunt with any source of approximately constant potential difference.

WYNN MEREDITH.
ANDREW M. HUNT.

Witnesses:
JAMES R. TOWNSEND,
ALFRED I. TOWNSEND.